(12) United States Patent
Ruth, II et al.

(10) Patent No.: US 6,607,843 B2
(45) Date of Patent: Aug. 19, 2003

(54) BRAZED CERAMIC SEAL FOR BATTERIES WITH TITANIUM-TITANIUM-6A1-4V CASES

(75) Inventors: Douglas Alan Ruth, II, Canyon Country, CA (US); Hisashi Tsukamoto, Saugus, CA (US); Clay Kishiyama, Valencia, CA (US); Andrew Szyszkowski, Canyon Country, CA (US)

(73) Assignee: Quallion LLC, Sylmar, CA (US)

( * ) Notice: Subject to any disclaimer, the term of this patent is extended or adjusted under 35 U.S.C. 154(b) by 87 days.

(21) Appl. No.: 09/774,450

(22) Filed: Jan. 30, 2001

(65) Prior Publication Data

US 2001/0046625 A1 Nov. 29, 2001

Related U.S. Application Data

(60) Provisional application No. 60/179,764, filed on Feb. 2, 2000.

(51) Int. Cl.[7] .................................................. H01M 2/02
(52) U.S. Cl. ..................... 428/621; 428/632; 428/633; 428/661; 428/469; 428/697; 228/124.6; 228/122.1
(58) Field of Search .............................. 428/621, 632, 428/633, 661, 467, 697, 660, 672, 702; 228/124.5, 122.1, 124.6, 262.72; 420/512

(56) References Cited

U.S. PATENT DOCUMENTS

| 4,158,721 A | 6/1979 | Decker et al. |
|---|---|---|
| 4,167,413 A | 9/1979 | Christ et al. |
| 4,180,700 A | 12/1979 | Kraska et al. |
| 4,217,137 A | 8/1980 | Kraska et al. |
| 4,722,137 A | 2/1988 | Ellenberger |
| 4,940,858 A | 7/1990 | Taylor et al. |
| RE34,819 E * | 1/1995 | Mizuhara ................. 420/508 |
| 6,335,117 B1 | 1/2002 | Yoshida et al. |
| 6,521,350 B2 | 2/2003 | Fey et al. |

FOREIGN PATENT DOCUMENTS

| EP | 0 235 504 A1 | 9/1987 | |
|---|---|---|---|
| JP | 59-012557 * | 1/1984 | ............ H01M/2/02 |
| JP | 01073750 A2 | 3/1989 | |
| JP | 1239958 A2 | 9/1989 | |
| JP | 01253941 A2 | 10/1989 | |
| JP | 5-60241 * | 3/1993 | ............ F16J/9/26 |
| JP | 10-012270 * | 1/1998 | .......... H01M/10/39 |
| JP | 11186423 A2 | 7/1999 | |
| JP | 2000-058033 A2 | 2/2000 | |
| JP | 2000068396 A2 | 3/2000 | |

* cited by examiner

Primary Examiner—Deborah Jones
Assistant Examiner—Vivek Koppikar
(74) Attorney, Agent, or Firm—M. Elizabeth Bush; Freilich, Hornbaker & Rosen

(57) ABSTRACT

The invention includes a brazed ceramic ring that separates the positive and negative ends of the battery while still providing a leak-tight seal. The ceramic is aluminum oxide or zirconium oxide or zirconium oxide with 3% yttrium. The invention includes a brazing material that is greater than 50% gold. The invention includes a titanium alloy case (Ti-6Al-4V) which is titanium with 6% aluminum and 4% vanadium as its major alloying elements. The case has the desirable properties of titanium such as high strength for a relatively low weight; and the case has the requisite ability and electro-activity to be used as a positive current carrying element where the battery's positive electrode exhibits more than 3.5 V vs. $Li/Li^+$.

5 Claims, 2 Drawing Sheets

BRAZED CERAMIC SEAL FOR BATTERIES WITH TITANIUM-TITANIUM-6A1-4V CASES

This application claims the benefit of Provisional Application No. 60/179,764, filed Feb. 2, 2000.

FIELD OF THE INVENTION

This invention relates to brazed ceramic seals for use in lithium ion batteries.

BACKGROUND OF THE INVENTION

A chemical battery case may act to prevent the positive and negative output devices from coming into contact, i.e., shorting. The battery case in its entirety also functions to contain and prevent leakage of battery materials such as an electrolyte. Moreover, the battery case itself must provide for mechanical strength to contain pressures originating from within the battery as well as to provide the mechanical strength for ordinary handling of the battery.

SUMMARY OF THE INVENTION

The invention includes a brazed ceramic ring that separates the positive and negative ends of the battery while still providing a leak-tight seal. The ceramic is aluminum oxide or zirconium oxide or zirconium oxide with 3% yttrium. The invention includes a brazing material, which is greater than 50% gold. The invention includes a titanium alloy case (Ti-6Al-4V) which is titanium with 6% aluminum and 4% vanadium as its major alloying elements. The case has the desirable properties of titanium such as high strength for a relatively low weight; and the case has the requisite ability and electro-activity to be used as a positive current carrying element where the battery's positive electrode exhibits more than 3.5 V vs. Li/Li$^+$.

BRIEF DESCRIPTION OF THE DRAWINGS

The above and other features and advantages of the invention will be more apparent from the following detailed description wherein.

DETAILED DESCRIPTION OF THE PREFERRED EMBODIMENT

The following description is of the best mode presently contemplated for carrying out the invention. This description is not to be taken in a limiting sense, but is merely made for the purpose of describing the general principles of the invention. The scope of the invention should be determined with reference to the claims.

Figure 1:
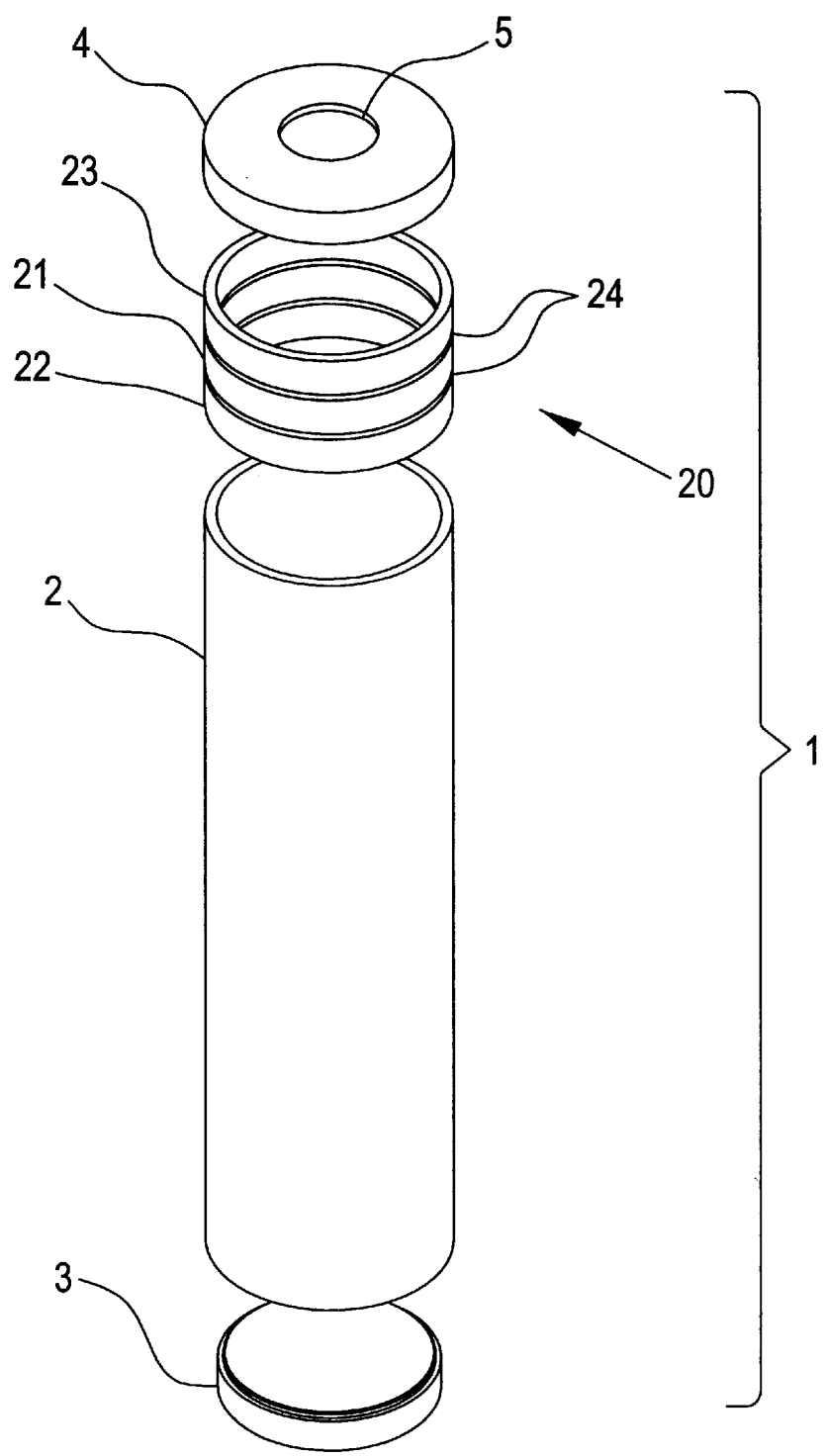
FIG. 1 shows the titanium alloy battery case with titanium and titanium alloy end caps and the ceramic non-conducting ring.
Figure 2:
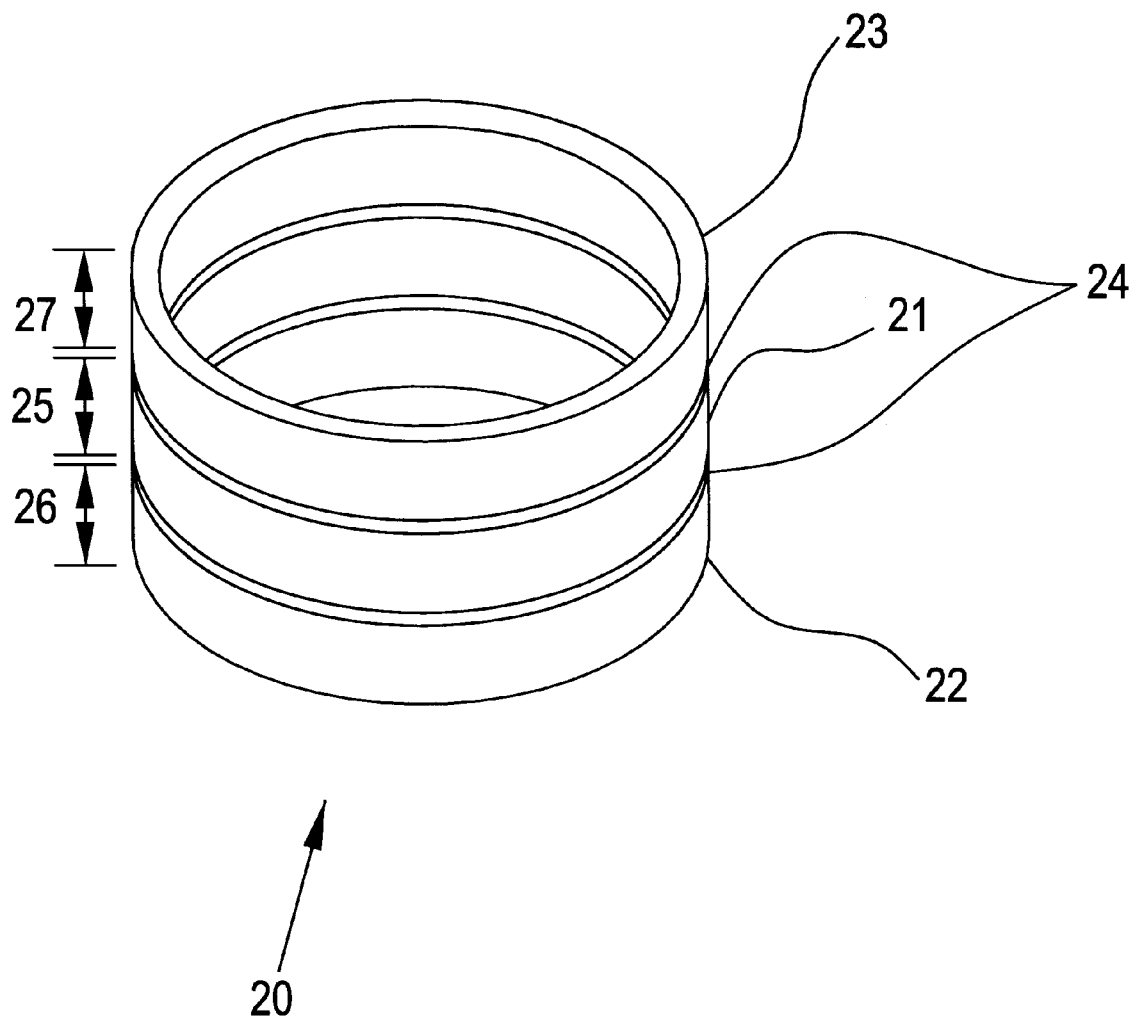
FIG. 2 shows the ceramic ring sandwich with the ceramic ring between a ring of Ti and a different ring of Ti-6Al-4V, and the gold-based braze.

The battery (1), as shown in FIG. 1, is constructed of a titanium alloy cylinder (2), the alloy being Ti-6Al-4V. This alloy is principally titanium with 6% aluminum and 4% vanadium, with oxygen, nitrogen, carbon, hydrogen, and iron typically present as trace elements. One end cap (3), which completes the bottom of the positive casing, is also of the titanium alloy Ti-6Al-4V. The ceramic ring sandwich (20) is shown in FIGS. 1 and 2. First looking at FIG. 2, the ceramic ring (21) is brazed by the gold alloy braze (24) to a ring of titanium (23) and to another ring of Ti-6Al-4V (22).

The gold alloy braze (24) is one that contains more than 50% gold by weight. A specific type of gold alloy braze (24) is 96.4% gold, 3.0% nickel, and 0.6% titanium. Some trace elements may be present with a corresponding slight adjustment in the composition percentages. The braze is chosen so that it can stand up to the electrochemical conditions inside the battery with which it will come in contact. The ceramic ring (21) is of aluminum oxide, zirconium oxide, or zirconium oxide with 3% yttrium.

Returning to FIG. 1, the ceramic ring sandwich (20) is placed on the open end of the titanium alloy cylinder (2) with the titanium alloy ring (22) toward the cylinder (2). The titanium alloy ring (22) is then laser welded to the titanium alloy cylinder (2). Subsequently, a titanium end cap (4) with a feedthrough hole (5) is laser welded to the titanium ring (23) of the ceramic ring sandwich (20).

In order to prevent any short-circuiting by way of the ceramic ring (21), it must be at least 10 $\mu$m in height (25). This arises from any diffusion of the gold alloy braze material (24) through the ceramic ring (21). Additionally, the height (27) of the titanium and the height (26) of the titanium alloy rings must be at least 30 $\mu$m. This is so that the gold alloy braze will not re-melt when the Ti and Ti-6Al-4V rings are laser welded.

Methods of assembly for the ceramic ring sandwich (20) include brazing together a sheet of ceramic material between a sheet of titanium and titanium alloy (Ti-6Al-4V) and then laser cutting a shape to fit the end of a given battery case. The sandwich can be cut into almost any desired geometrical shape. Another method is cutting out the ceramic ring (21) and the titanium alloy (Ti-6Al-4V) ring (22) and the titanium ring (23) separately and brazing the pieces together.

The titanium alloy (Ti-6Al-4V) cylinder (2) has the desirable properties of titanium, such as high strength for a relatively low weight; and the case has the requisite ability and electro-activity to be used as a positive current carrying element where a battery's positive electrode exhibits more than 3.5 V vs Li/Li$^+$.

Typically, once the ceramic sandwich (20) is welded to the cylinder (2), the battery electrodes (not shown) can be inserted into the cylinder (2) and the feedthrough pin (not shown) inserted through the hole (5) in the lid end cap (4). The feedthrough pin (not shown) is welded shut to provide a leak-tight seal. The battery (1) is filled with electrolyte (not shown) and laser welded closed on the bottom end cap (3). Tabs (not shown), which are connected to the positive electrode (not shown), can be folded out of the case and the laser welded at the same time as the bottom end cap (3).

While the invention herein disclosed has been described by means of specific embodiments and applications thereof, numerous modifications and variations could be made thereto by those skilled in the art without departing from the scope of the invention set forth in the claims.

What is claimed is:

1. A brazed ceramic ring comprising:
    a first comprising ceramic material selected from the group consisting of aluminum oxide, zirconium oxide, and zirconium oxide with 3% yttrium;
    a second ring comprising titanium attached to said first ring with a gold alloy braze; and
    a third ring comprising titanium attached to said first ring with said gold alloy braze;
    wherein said gold alloy braze has a gold content of more than 50% wt.

2. The brazed ceramic ring sandwich of claim 1 wherein said gold alloy braze comprises 96.4% gold, 3.0% nickel, and 0.6% titanium.

3. The brazed ceramic ring sandwich of claim 1 wherein said third ring comprises Ti-6Al-4V.

4. A brazed ceramic ring sandwich for a lithium ion battery comprising a first ring ceramic material selected from the group consisting of aluminum oxide, zirconium oxide and zirconium oxide with 3% yttrium; a second ring of titanium; a third ring of titanium alloy of aluminum and vanadium, Ti-6Al-4V; a gold alloy braze with a gold content by weight of more than 50%; wherein said gold alloy braze attached said second ring of titanium to said first ceramic ring; wherein said gold alloy attached said third ring of titanium alloy to the other edge of the ceramic ring.

5. The brazed ceramic ring sandwich of claim 4 wherein said gold alloy braze comprises 96.4% gold, 3.0% nickel and 0.6% titanium.

\* \* \* \* \*

UNITED STATES PATENT AND TRADEMARK OFFICE
CERTIFICATE OF CORRECTION

PATENT NO.     : 6,607,843 B2
DATED          : August 19, 2003
INVENTOR(S)    : Douglas Alan Ruth, II et al.

It is certified that error appears in the above-identified patent and that said Letters Patent is hereby corrected as shown below:

<u>Column 2,</u>
Line 55, please amend Claim 1 to read as follows:

-- 1. A brazed ceramic ring sandwich comprising:
   a first comprising ceramic material selected from the
      group consisting of aluminum oxide, zirconium oxide,
      and zirconium oxide with 3% yttrium;
   a second ring comprising titanium attached to said first
      ring with a gold alloy braze; and
   a third ring comprising titanium attached to said first ring
      with said gold alloy braze;
   wherein said gold alloy braze has a gold content of more
      than 50% wt.--

Signed and Sealed this

Eleventh Day of May, 2004

JON W. DUDAS
*Acting Director of the United States Patent and Trademark Office*